(12) United States Patent
Liu et al.

(10) Patent No.: US 9,781,682 B2
(45) Date of Patent: Oct. 3, 2017

(54) METHOD FOR POWER-ON CONTROL OF MOBILE TERMINAL

(75) Inventors: Jiajun Liu, Shenzhen (CN); Jihong Wang, Shenzhen (CN)

(73) Assignee: XI'AN ZTE NEW SOFTWARE COMPANY LIMITED, Xi'an (CN)

( * ) Notice: Subject to any disclaimer, the term of this patent is extended or adjusted under 35 U.S.C. 154(b) by 620 days.

(21) Appl. No.: 14/343,131

(22) PCT Filed: Nov. 11, 2011

(86) PCT No.: PCT/CN2011/082095
§ 371 (c)(1),
(2), (4) Date: Mar. 6, 2014

(87) PCT Pub. No.: WO2013/033948
PCT Pub. Date: Mar. 14, 2013

(65) Prior Publication Data
US 2014/0219154 A1 Aug. 7, 2014

(30) Foreign Application Priority Data
Sep. 6, 2011 (CN) .......................... 2011 1 0262573

(51) Int. Cl.
*G06F 1/32* (2006.01)
*H04W 52/02* (2009.01)

(52) U.S. Cl.
CPC ...... *H04W 52/0274* (2013.01); *G06F 1/3206* (2013.01); *Y02B 60/50* (2013.01)

(58) Field of Classification Search
CPC ..... G06F 1/32; G06F 1/28; G06F 1/26; G06F 1/00
(Continued)

(56) References Cited

U.S. PATENT DOCUMENTS

| 5,319,588 A | * | 6/1994 | Haines | ................. G06F 7/5443 708/552 |
| 5,857,151 A | * | 1/1999 | Heinonen | ............ H02J 7/0006 455/321 |

(Continued)

FOREIGN PATENT DOCUMENTS

| CN | 200973024 Y | 11/2007 |
| CN | 101304568 A | 11/2008 |

(Continued)

OTHER PUBLICATIONS

International Search Report for corresponding application PCT/CN2011/082095 filed Nov. 11, 2011; Mail date Jun. 14, 2012.
(Continued)

*Primary Examiner* — Jaweed A Abbaszadeh
*Assistant Examiner* — Keshab Pandey
(74) *Attorney, Agent, or Firm* — Cantor Colburn LLP (57) ABSTRACT

The disclosure discloses a method for power-on control of a mobile terminal and a mobile terminal. The method includes: when a power-on detection flag bit in a mobile terminal is at a high level, judging whether there is an external power supply access event; if it is judged that there is an external power supply access event, and it is detected that the mobile terminal is in a power-off status currently, then triggering an external power supply power-on event, and setting the power-on detection flag bit to a high level; if it is judged that there is no external power supply access event, then judging whether there is a key-pressing event; and if it is judged that there is a key-pressing event, and it is determined that the key-pressing event is used for controlling to turn on the mobile terminal, then triggering a key-pressing power-on event, and setting the power-on detection flag bit to a high level. The technical solution of the disclosure proposes a specific implementation solution (Continued)

for supporting two types of power-on events using an existing power supply management chip.

12 Claims, 4 Drawing Sheets

(58) Field of Classification Search
USPC ....... 713/300, 310, 320, 321, 322, 323, 324, 713/340, 375
See application file for complete search history.

(56) References Cited

U.S. PATENT DOCUMENTS

| | | | |
|---|---|---|---|
| 6,055,619 A * | 4/2000 | North | G10H 7/002 704/270 |
| 6,348,744 B1 | 2/2002 | Levesque | |
| 7,281,150 B1 * | 10/2007 | Strickland | G06F 1/26 327/142 |
| 8,006,109 B2 * | 8/2011 | Motomiya | G06F 1/26 700/297 |
| 2008/0270809 A1 * | 10/2008 | Hoffer | G06F 1/266 713/300 |
| 2010/0250974 A1 | 9/2010 | Ristic | |
| 2011/0264942 A1 * | 10/2011 | Tsukamoto | G06F 1/266 713/324 |

FOREIGN PATENT DOCUMENTS

| | | |
|---|---|---|
| CN | 101399862 A | 4/2009 |
| CN | 101931696 A | 12/2010 |
| EP | 1596270 A1 | 11/2005 |

OTHER PUBLICATIONS

European Search Report for corresponding application EP11871972; Report dated Jan. 8, 2016.

* cited by examiner

METHOD FOR POWER-ON CONTROL OF MOBILE TERMINAL

TECHNICAL FIELD

The disclosure relates to power-on control technologies of a mobile terminal, and particularly, to a method for power-on control of a mobile terminal, and a mobile terminal.

BACKGROUND

In the prior art, a Universal Serial Bus (USB)+Wireless Fidelity (WIFI) type of mobile terminal (referred to as a UFI type of mobile terminal hereinafter) is a product for sharing the Internet. A power management chip usually used by the UFI type of mobile terminal generally has two power-on events: an external power supply power-on event and a key-pressing power-on event. Correspondingly, the mobile terminal generally has two power-on detection interfaces, one for supporting the external power supply power-on event and the other for supporting the key-pressing power-on event. The two independent power-on detection interfaces enable the UFI type of mobile terminal to realize external power supply power-on and key-pressing power-on without both of the power-on methods affecting each other.

The above-mentioned key-pressing power-on event means that all the functions of the mobile terminal are enabled, including a charging function, a radio frequency function, and so on; while the external power supply power-on event means that the mobile terminal enables the charging function only, and all the other functions (such as the radio frequency function, etc.) are not enabled, thereby realizing power-off charging.

The existing power management chip used in the mobile terminal has a low price. However, the power management chip in the prior art only retains the key-pressing power-on event and fails to provide the external power supply power-on event, without considering the features of the UFI type of mobile terminal. When a power-on event is triggered, the power-on detection flag bit of the power management chip is pulled low, and at this moment the mobile terminal is power-on. Since the UFI type of mobile terminal mostly needs to support external power supply power-on so as to support power-off charging, that is, the mobile terminal needs to support two types of power-on events (the external power supply power-on event and the key-pressing power-on event), if these two power-on events are controlled through a power-on detection flag bit, then the two power-on events will both pull the power-on detection flag bit low, which will generate conflicts that affect a power-off flow of the mobile terminal and thus render the mobile terminal not being able to be powered off. Therefore, the mobile terminal cannot directly use this type of power management chip.

Hence, the problem demanding prompt solution in the prior art is how the mobile terminal uses the existing power management chip to support two types of power-on events.

SUMMARY

Embodiments of the disclosure provide a method for power-on control of a mobile terminal and a mobile terminal, which propose a specific implementation solution for supporting two types of power-on events using an existing power management chip.

The technical solution of the embodiments of the disclosure is as follows.

A method for power-on control of a mobile terminal includes: when a power-on detection flag bit in a mobile terminal is at a high level, judging whether there is an external power supply access event; if it is judged that there is an external power supply access event, and it is detected that the mobile terminal is in a power-off status currently, then triggering an external power supply power-on event, and setting the power-on detection flag bit to a high level; if it is judged that there is no external power supply access event, then judging whether there is a key-pressing event; and if it is judged that there is a key-pressing event, and it is determined that the key-pressing event is used for controlling to turn on the mobile terminal, then triggering a key-pressing power-on event, and setting the power-on detection flag bit to a high level.

A mobile terminal includes: an external power supply access judgment unit configured to judge whether there is an external power supply access event when a power-on detection flag bit of the mobile terminal is at a high level; a status detection unit, configured to detect whether the mobile terminal is in a power-off status currently; an external power supply power-on unit, configured to trigger an external power supply power-on event if the external power supply access judgment unit judges that there is an external power supply access event and the status detection unit detects that the mobile terminal is in the power-off status currently; a key-pressing judgment unit, configured to judge whether there is a key-pressing event when the external power supply access judgment unit judges that there is no external power supply access event; a key-pressing event determination unit, configured to determine whether the key-pressing event is used for controlling to turn on the mobile terminal; a key-pressing power-on unit, configured to trigger a key-pressing power-on event when the key-pressing judgment unit judges that there is a key-pressing event and the key-pressing event determination unit determines that the key-pressing event is used for controlling to turn on the mobile terminal; and a power-on detection flag bit control unit, configured to set the power-on detection flag bit to a high level after the external power supply power-on unit triggers the external power supply power-on event or the key-pressing power-on unit triggers the key-pressing power-on event.

Beneficial effects of the disclosure are described as follows.

In the technical solution of the embodiments of the disclosure, it is first judged whether there is an external power supply access event when a power-on detection flag bit in a mobile terminal is at a high level, if it is judged that there is an external power supply access event and it is detected that the mobile terminal is in a power-off status currently, then an external power supply power-on event is triggered, and the power-on detection flag bit is set to a high level, if it is judged that there is no external power supply access event, then it is judged whether there is a key-pressing event, and if there is a key-pressing event and it is determined that the key-pressing event is used for controlling to turn on the mobile terminal, then a key-pressing power-on event is triggered, and the power-on detection flag bit is set to a high level. Hence, the technical solution of the embodiments of the disclosure is capable of supporting two types of power-on events using an existing power management chip, which not only realizes key-pressing power-on but also realizes external power supply power-on.

BRIEF DESCRIPTION OF THE DRAWINGS

Drawings, provided for further understanding of the disclosure and forming a part of the disclosure, are used to explain the disclosure together with the illustrative embodiments and description of the disclosure rather than to limit the disclosure. In the drawings.

DETAILED DESCRIPTION OF THE EMBODIMENTS

In order to make the technical problems to be solved by the disclosure, the technical solutions and the beneficial effect more clear, the disclosure will be described in further detail below in conjunction with the accompanying drawings and embodiments. It should be understood that the particular embodiments described herein are merely used to explain the disclosure, but not to limit the disclosure.

Figure 1:
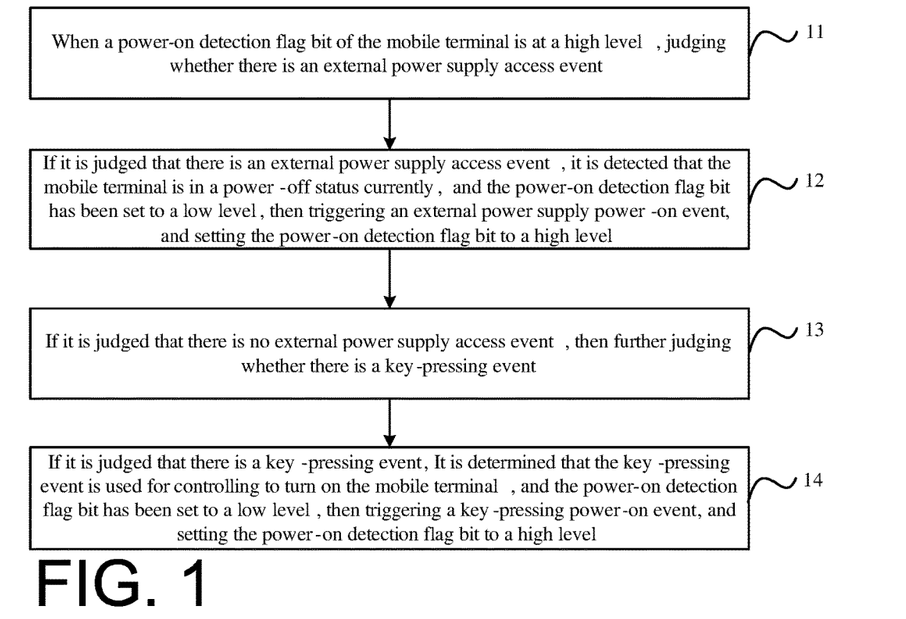
FIG. 1 is a schematic flow chart of a method for power-on control of a mobile terminal in an embodiment of the disclosure.

FIG. 1 is a flow chart of a method for power-on control of a mobile terminal in an embodiment of the disclosure. As shown in FIG. 1, the specific processing flow is described as follows.

In Step 11, when a power-on detection flag bit of the mobile terminal is at a high level, it is judged whether there is an external power supply access event.

In this step, when judging whether there is an external power supply access event, the mobile terminal can first judge whether a power connection detection flag bit connected to external power supply is at a high level, if it is judged to be at a high level, then it is determined that there is an external power supply access event; otherwise, it is determined that there is no external power supply access event.

In Step 12, if it is judged that there is an external power supply access event, and it is detected that the mobile terminal is in a power-off status currently, then an external power supply power-on event is triggered, and the power-on detection flag bit is set to a high level.

In this step, when judging that there is an external power supply access event, the mobile terminal needs to first detect whether the mobile terminal is in a power-off status or a power-on status currently; if the mobile terminal is in the power-on status, then it represents that at this moment the mobile terminal has enabled the charging function, so the mobile terminal can remain in the power-on status; and if the mobile terminal is in the power-off status, then it represents that the mobile terminal needs to carry out external power supply power-on, i.e. power-off charging.

The mobile terminal can detect the current status via a power-on status flag bit. Specifically, it is first judged whether the power-on status flag bit is at a low level; if it is judged that the power-on status flag bit is at a low level, then it is determined that the mobile terminal is in the power-off status currently; and if it is judged that the power-on status flag bit is at a high level, then it is determined that the mobile terminal is in the power-on status currently.

Subsequently, after triggering the external power supply power-on event or triggering the key-pressing power-on event, the mobile terminal needs to set the power-on status flag bit to a high level.

In Step 13, if it is judged that there is no external power supply access event, then it is judged whether there is a key-pressing event.

If a user presses a key to turn off or turn on the mobile terminal, the power-on detection flag bit of the mobile terminal is set to a low level, and after the key is released, the power-on detection flag bit is set to a high level. Therefore, the mobile terminal can detect whether there is a key-pressing event through the power-on detection flag bit, specifically, the mobile terminal first judges whether the power-on detection flag bit is set to a low level; if it is judged that the power-on detection flag bit is set to a low level, then it can be determined that there is a key-pressing event; otherwise, it is determined that there is no key-pressing event.

In Step 14, if it is judged that there is a key-pressing event, and it is determined that the key-pressing event is used for controlling to turn on the mobile terminal, then a key-pressing power-on event is triggered, and the power-on detection flag bit is set to a high level.

After the mobile terminal judges that there is a key-pressing event, since the key-pressing event might be used for controlling to turn on the mobile terminal or for controlling to turn off the mobile terminal, it is necessary to determine, before triggering the key-pressing power-on event, that this key-pressing event is used for controlling to turn on the mobile terminal. The mobile terminal can sample each key-pressing event generated by the mobile terminal, and then determines, according to the sampling result, whether this key-pressing event is used for controlling to turn on the mobile terminal. For example, the first key-pressing event is used for controlling to turn on the mobile terminal, the second key-pressing event is used for controlling to turn off the mobile terminal, and so on. If this key-pressing event is determined to be used for controlling to turn off the mobile terminal, then a power-off event is triggered.

It can be seen from the above-mentioned processing flow that in the technical solution of the embodiment of the disclosure, it is first judged whether there is an external power supply access event when a power-on detection flag bit in a mobile terminal is at a high level, if it is judged that there is an external power supply access event and it is detected that the mobile terminal is in a power-off status currently, then an external power supply power-on event is triggered, and the power-on detection flag bit is set to a high level; if it is judged that there is no external power supply access event, then it is judged whether there is a key-pressing event, and if there is a key-pressing event and it is determined that the key-pressing event is used for controlling to turn on the mobile terminal, then a key-pressing power-on event is triggered, and the power-on detection flag bit is set to a high level. Hence, the technical solution of the embodiment of the disclosure is capable of supporting two types of power-on events using an existing power management chip, which not only realizes key-pressing power-on but also realizes external power supply power-on.

Figure 2:
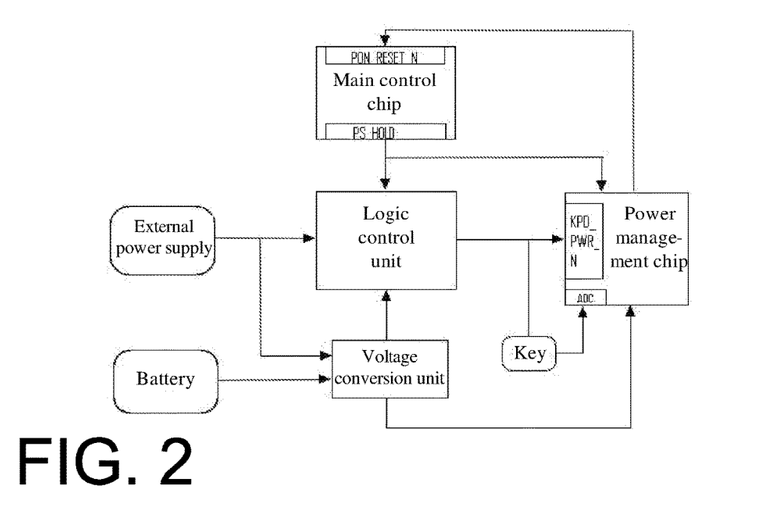
FIG. 2 is a schematic diagram of the principle of the method for power-on control of a mobile terminal in an embodiment of the disclosure.

As shown in FIG. 2, this figure is a schematic diagram of the principle of the method for power-on control of a mobile terminal proposed in an embodiment of the disclosure. The technical solution of the embodiment of the disclosure is completed by a logic control unit, a main control chip, a power management chip, a voltage conversion unit, an external power supply, a battery and a key.

The external power supply may be powered by a USB interface and may also be powered by an adapter.

The external power supply is directly connected to the logic control unit and the voltage conversion unit. After converting the external power supply voltage, the voltage conversion unit powers the logic control unit and supplies battery voltage to the power management chip, and the battery powers the voltage conversion unit.

The main control chip, the power management chip and the logic control unit constitute a feedback loop, wherein the logic control unit is connected to the power management chip, and the logic control unit forms a logical judgment result according to the access condition of the external power supply and notifies same to the power management chip, and the power management chip judges whether to turn on the mobile terminal or not, and outputs an output signal to the main control chip, which then feeds back a feedback signal to the logic control unit and the power management chip to prepare for the next power-on and power-off flow.

Figure 3:
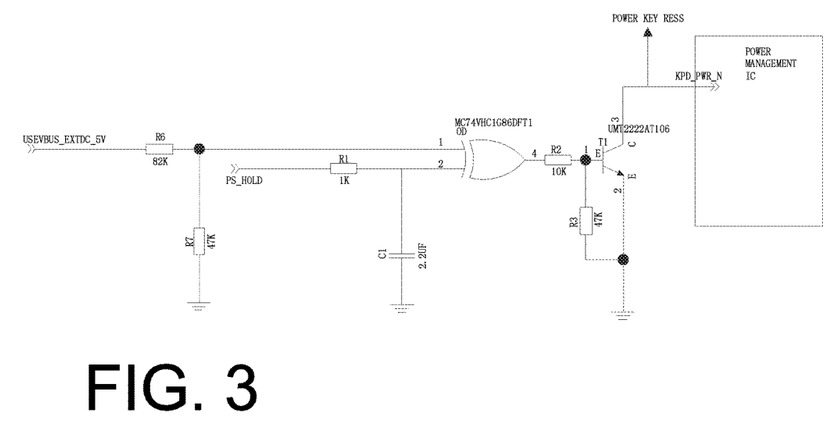
FIG. 3 is circuit schematic diagram I of a logic control unit in an embodiment of the disclosure.
Figure 4:
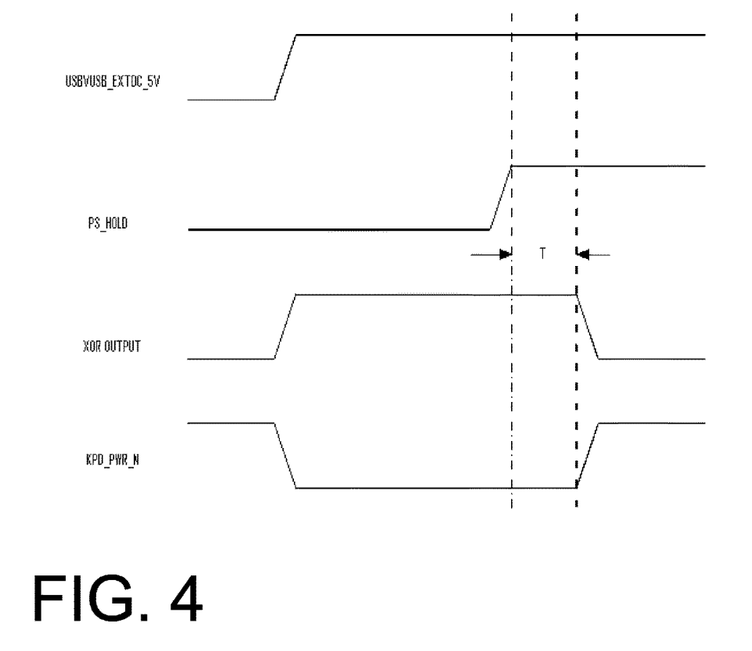
FIG. 4 is a time sequence schematic diagram in an embodiment of the disclosure.

As shown in FIG. 3, this figure is a circuit schematic diagram of a logical function unit in the technical solution of the embodiment of the disclosure. The logical function unit contains two voltage divider circuits, one delay circuit, one XOR gate and one transistor. FIG. 4 is a time sequence diagram of the above-mentioned circuit. After an external power supply is accessed, a power-on status flag bit PS_HOLD is at a low level, a power connection detection flag bit USBVBUS_EXTDC_5V is at a high level, an output XOR_OUTPUT of the XOR gate is at a high level, the transistor is turned on, and the power-on detection flag bit KPD_PWR_N is at a low level; when the power management chip detects that KPD_PWR_N is at a low level, a power-on event is triggered and the mobile terminal is powered on, and after completing the power-on procedure, PS_HOLD is pulled high, and at this moment, the output XOR_OUTPUT of the XOR gate is at a low level, the transistor is turned off, KPD_PWR_N is pulled high internally, and the mobile terminal waits for the next power-on and power-off flow. When a key is pressed, KPD_PWR_N is pulled low, when the power management chip detects that KPD_PWR_N is at a low level, the power-on event is triggered and the mobile terminal is powered on, and after the user releases the key, KPD_PWR_N is pulled high internally, and the mobile terminal waits for the next power-on and power-off flow.

As shown in FIG. 3, a first level voltage divider circuit R6 and R7 divide 5 V input voltage into 1.8 V voltage, which is then sent to the XOR gate for XOR logical judgment with PS_HOLD, then the judgment result is subjected to secondary voltage dividing and is divided into 1.5 V using R2 and R3, then the 1.5 V voltage is connected to the transistor T1 to control the transistor T1.

Figure 5:
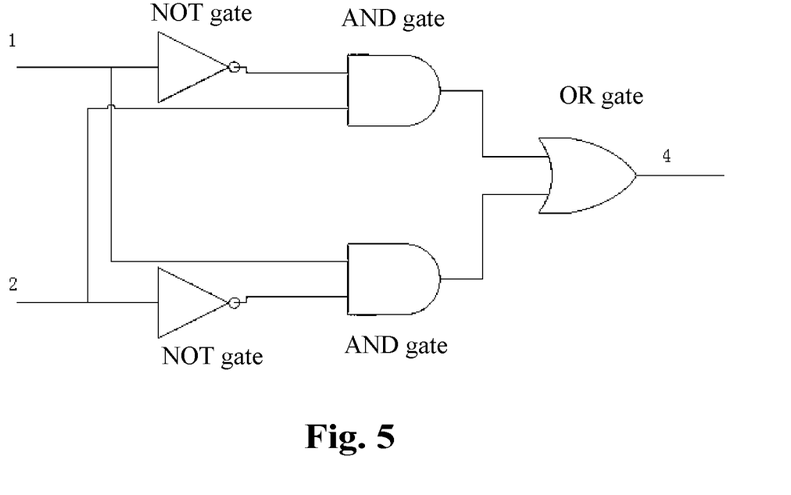
FIG. 5 is circuit schematic diagram II of the logic control unit in an embodiment of the disclosure.
Figure 6:
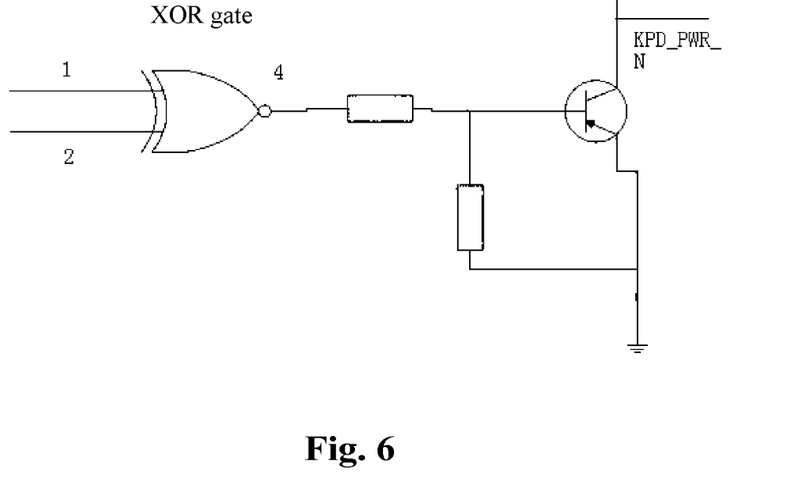
FIG. 6 is circuit schematic diagram III of the logic control unit in an embodiment of the disclosure.

As regards the circuit shown in FIG. 4, the embodiments of the disclosure propose two reformed circuits which can also realize the technical solution of the disclosure. The first reformed circuit is as shown in FIG. 5, which consists of two NOT gates, two AND gates and one OR gate, and realizes the logical function of the MC74VHC1G86DFT1 device in FIG. 4, with the connection modes of other circuits unchanged. The second reformed circuit is as shown in FIG. 6, which consists of one XOR gate and one PNP-type transistor, and realizes the logical functions of the MC74VHC1G86DFT1 device and the UMT2222AT106 device in FIG. 4, with the connection modes of other circuits unchanged.

Figure 7:
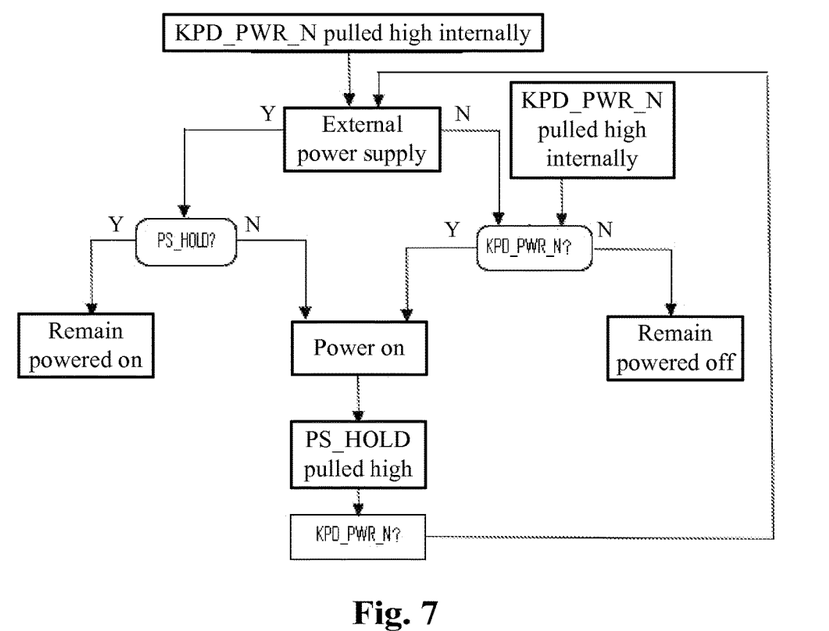
FIG. 7 is a schematic flow chart of specific implementation of the method for power-on control of a mobile terminal in an embodiment of the disclosure.

As shown in FIG. 7, the specific processing flow of the specific implementation flow chart of the method for power-on control of a mobile terminal in an embodiment of the disclosure is described as follows.

When the mobile terminal is in any status, KPD_PWR_N is first pulled high internally, and then it is detected whether there is an external power supply access event; and if there is an external power supply access event, then it is detected whether PS_HOLD is at a high level, and if PS_HOLD is at a high level, it represents that the mobile terminal is already in the power-on status, and at this moment the two inputs of the XOR gate are high level and the output thereof is a low level, so that the transistor T1 is turned off, KPD_PWR_N is internally pulled high, and the mobile terminal remains in the power-on status; if there is an external power supply access event and PS_HOLD is at a low level, then the output of the XOR gate is at a high level (1.5 V), the transistor T1 is turned on, KPD_PWR_N is set to a low level, when detecting that KPD_PWR_N is at a low level, the power management chip triggers a power-on event, and after the mobile terminal is powered on, the software will set PS_HOLD as high, then this signal is subjected to an XOR operation with USBVBUS_EXTDC_5 V, and at this moment the output of the XOR gate changes to a low level, the transistor T1 is turned off, KPD_PWR_N is again set to a high level, and the flow returns to the step of detecting whether there is an external power supply access event.

If there is no external power supply access event, then it is detected whether there is a key-pressing event. If it is detected that there is a key-pressing event, KPD_PWR_N is set to a low level, and after the power management chip detects the key-pressing event, it begins to trigger the power-on event, and after the mobile terminal is turned on, software will set PS_HOLD as a high level; after the key is released, KPD_PWR_N is pulled high, the flow returns to the step of detecting whether there is an external power supply access event. If there is no key-pressing event, then the mobile terminal remains in a power-off status.

After the mobile terminal is turned on, it is first detected whether it is an external power supply power-on or a key-pressing power-on, and then it is judged whether it is needed to display information on a screen of the mobile terminal; if it is judged that it is not needed to display information on the screen, then only charging status information is displayed, and if it is judged that it is needed to display information on the screen, the charging status information in addition to other information are displayed.

The logical states of the logic control unit are as shown in the table below:

| | Flag bit | | |
|---|---|---|---|
| | USBVUSB_EXTDC_5V | PS_HOLD | KPD_PWR_N |
| Logical state | L | L | H |
| | H | L | L |
| | L | H | L |
| | H | H | H | where L represents a low level and H represents a high level.

As can be seen from the above table, the situation where USBVBUS_EXTDC_5 V is at a low level, PS_HOLD is at a high level, and KPD_PWR_N is at a low level occurs in two cases. One case is that the external power supply is unplugged during the key-pressing power-on, the mobile terminal should not be powered off at this moment, while the logic control unit sets KPD_PWR_N to a low level and triggers a power-off event, and therefore, the software needs to be involved in the judgment, so that the software can detect whether that the low level of KPD_PWR_N is triggered by key pressing, for the situation where the low level of KPD_PWR_N is not triggered by key pressing, this power-off event is ignored and the mobile terminal remains in the power-on status. The other case is that the key-pressing power-on is performed when there is no external power supply access, so after power-on, PS_HOLD is pulled high and USBVBUS_EXTDC_5 V is at a low level, which will trigger the power-off event at this moment, but at this moment the mobile terminal should not be powered off, and therefore the software needs to be involved in the judgment to ignore this power-off event.

Figure 8:
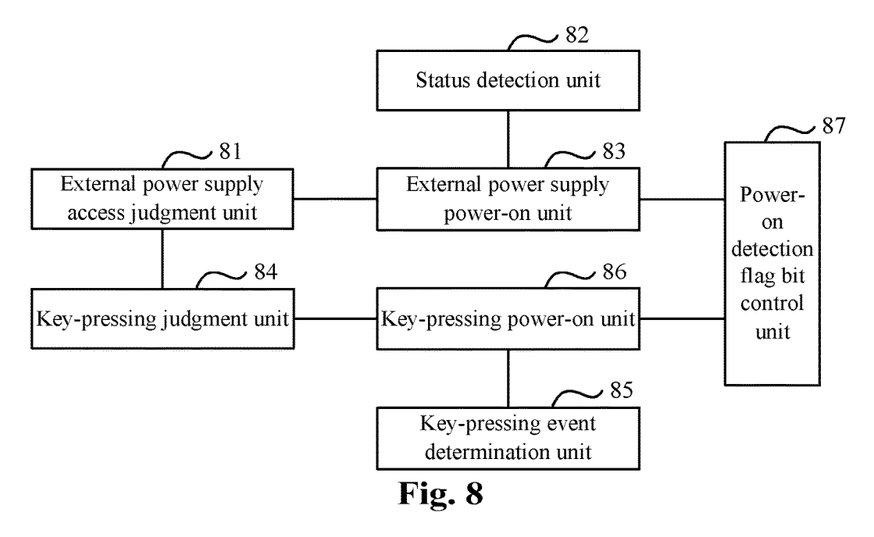
FIG. 8 is a structural schematic diagram of a mobile terminal in an embodiment of the disclosure.

As shown in FIG. 8, this figure is a structural schematic diagram of the mobile terminal proposed in an embodiment of the disclosure, which includes:

an external power supply access judgment unit 81 configured to judge whether there is an external power supply access event when a power-on detection flag bit of the mobile terminal is at a high level;

a status detection unit 82 configured to detect whether the mobile terminal is in a power-off status currently;

an external power supply power-on unit 83 configured to trigger an external power supply power-on event if the external power supply access judgment unit 81 judges that there is an external power supply access event and the status detection unit 82 detects that the mobile terminal is in the power-off status currently;

a key-pressing judgment unit 84 configured to judge whether there is a key-pressing event when the external power supply access judgment unit 81 judges that there is no external power supply access event;

a key-pressing event determination unit 85 configured to determine whether this key-pressing event is used for controlling to turn on the mobile terminal;

a key-pressing power-on unit 86 configured to trigger a key-pressing power-on event when the key-pressing judgment unit 84 judges that there is a key-pressing event and the key-pressing event determination unit 85 determines that the key-pressing event is used for controlling to turn on the mobile terminal; and a power-on detection flag bit control unit 87 configured to set the power-on detection flag bit to a high level after the external power supply power-on unit 83 triggers the external power supply power-on event or the key-pressing power-on unit 86 triggers the key-pressing power-on event.

Preferably, the external power supply access judgment unit 81 specifically includes:

a power connection detection flag bit judgment subunit configured to judge whether a power connection detection flag bit connected to the external power supply is at a high level; and an external power supply access determination subunit configured to determine that there is an external power supply access event when the power connection detection flag bit judgment subunit judges that the power connection detection flag bit is at a high level; otherwise, determine that there is no external power supply access event.

Preferably, the status detection unit 82 specifically includes:

a power-on status flag bit judgment subunit configured to judge whether a power-on status flag bit is at a low level; and a status determination subunit configured to determine that the mobile terminal is detected to be in the power-off status currently when the power-on status flag bit judgment subunit judges that the power-on status flag bit is at a low level.

Preferably, the mobile terminal further includes a power-on status flag bit control unit configured to set the power-on status flag bit to a high level after the external power supply power-on unit 83 triggers the external power supply power-on event or the key-pressing power-on unit 86 triggers the key-pressing power-on event.

Preferably, the key-pressing judgment unit 84 specifically includes:

a power-on detection flag bit judgment subunit configured to judge whether a power-on detection flag bit is set to a low level; and a key-pressing determination subunit configured to determine that there is a key-pressing event when the power-on detection flag bit judgment subunit judges that the power-on detection flag bit is set to a low level; otherwise, determine that there is no key-pressing event.

Preferably, the key-pressing determination unit 85 specifically includes:

a key-pressing event sampling subunit configured to sample each key-pressing event generated by the mobile terminal; and a key-pressing event determination subunit configured to determine, according to the sampling result of the key-pressing event sampling subunit, whether the key-pressing event is used for controlling to turn on the mobile terminal.

The above description shows and describes preferred embodiments of the disclosure, but as mentioned previously, it should be understood that the disclosure is not limited to the form disclosed herein and should not be seen as excluding other embodiments, but may be used for various other combinations, modifications, and environments and is capable of changes within the scope of vision of the disclosure described herein by way of the above teachings or technology or knowledge of related arts. In addition, the modifications and variations conducted by a person skilled in the art without departing from the scope of the disclosure should all be within the scope of protection of the appended claims of the disclosure.

What is claimed is:

1. A method for power-on control of a mobile terminal, comprising:
    when a power-on detection flag bit of a mobile terminal is at a high level, judging whether there is an external power supply access event;
    if it is judged that there is an external power supply access event, it is detected that the mobile terminal is in a power-off status currently, and the power-on detection flag bit has been set to a low level, then triggering an external power supply power-on event, and setting the power-on detection flag bit to a high level;
    if it is judged that there is no external power supply access event, then further judging whether there is a key-pressing event; and
    if it is judged that there is a key-pressing event, it is determined that the key-pressing event is used for controlling to turn on the mobile terminal, and the power-on detection flag bit has been set to a low level, then triggering a key-pressing power-on event, and setting the power-on detection flag bit to a high level.

2. The method according to claim 1, wherein judging whether there is an external power supply access event is embodied as:

judging whether a power connection detection flag bit connected to external power supply is at a high level; and if the power connection detection flag bit is judged to be at a high level, then determining that there is an external power supply access event; otherwise, determining that there is no external power supply access event.

3. The method according to claim 1, wherein detecting that the mobile terminal is in the power-off status currently is embodied as:

when it is judged that a power-on status flag bit is at a low level, determining that the mobile terminal is detected to be in the power-off status currently.

4. The method according to claim 3, wherein after the external power supply power-on event or the key-pressing power-on event is triggered, the power-on status flag bit is set to a high level.

5. The method according to claim 1, wherein judging whether there is a key-pressing event comprises:

judging whether the power-on detection flag bit is set to a low level; and if it is judged that the power-on detection flag bit is set to a low level, then determining that there is a key-pressing event; otherwise, determining that there is no key-pressing event.

6. The method according to claim 1, wherein determining that the key-pressing event is used for controlling to turn on the mobile terminal comprises:

sampling each key-pressing event generated by the mobile terminal; and determining, according to a sampling result, whether the key-pressing event is used for controlling to turn on the mobile terminal.

7. A mobile terminal, comprising a hardware processor, configured to perform programming units stored in a memory, wherein the programming units comprise:

an external power supply access judgment unit, connected with an external power supply power-on unit and configured to judge whether there is an external power supply access event when a power-on detection flag bit of the mobile terminal is at a high level;

a status detection unit, connected with the external power supply power-on unit and configured to detect whether the mobile terminal is in a power-off status currently;

the external power supply power-on unit, connected with an power-on detection flag bit control unit and configured to trigger an external power supply power-on event if the external power supply access judgment unit judges that there is an external power supply access event, the status detection unit detects that the mobile terminal is in the power-off status currently, and the power-on detection flag bit has been set to a low level;

a key-pressing judgment unit, connected with the external power supply access judgment unit and configured to judge whether there is a key-pressing event when the external power supply access judgment unit judges that there is no external power supply access event;

a key-pressing event determination unit, connected with a key-pressing power-on unit and configured to determine whether the key-pressing event is used for controlling to turn on the mobile terminal;

the key-pressing power-on unit, connected with the power-on detection flag bit control unit and configured to trigger a key-pressing power-on event when the key-pressing judgment unit judges that there is a key-pressing event, the key-pressing event determination unit determines that the key-pressing event is used for controlling to turn on the mobile terminal, and the power-on detection flag bit has been set to a low level; and the power-on detection flag bit control unit, connected with the external power supply power-on unit and the key-pressing power-on unit, and configured to set the power-on detection flag bit to a high level after the external power supply power-on unit triggers the external power supply power-on event or the key-pressing power-on unit triggers the key-pressing power-on event.

8. The mobile terminal according to claim 7, wherein the external power supply access judgment unit comprises:

a power connection detection flag bit judgment subunit, configured to judge whether a power connection detection flag bit connected to external power supply is at a high level; and an external power supply access determination subunit, configured to determine that there is an external power supply access event when the power connection detection flag bit judgment subunit judges that the power connection detection flag bit is at a high level; otherwise, determine that there is no external power supply access event.

9. The mobile terminal according to claim 7, wherein the status detection unit comprises:

a power-on status flag bit judgment subunit, configured to judge whether a power-on status flag bit is at a low level; and a status determination subunit, configured to determine that the mobile terminal is detected to be in the power-off status currently when the power-on status flag bit judgment subunit judges that the power-on status flag bit is at a low level.

10. The mobile terminal according to claim 9, further comprising:

a power-on status flag bit control unit, configured to set the power-on status flag bit to a high level after the external power supply power-on unit triggers the external power supply power-on event or the key-pressing power-on unit triggers the key-pressing power-on event.

11. The mobile terminal according to claim 7, wherein the key-pressing judgment unit comprises:

a power-on detection flag bit judgment subunit, configured to judge whether the power-on detection flag bit is set to a low level; and a key-pressing determination subunit, configured to determine that there is a key-pressing event when the power-on detection flag bit judgment subunit judges that the power-on detection flag bit is set to a low level; otherwise, determine that there is no key-pressing event.

12. The mobile terminal according to claim 7, wherein the key-pressing event determination unit comprises:

a key-pressing event sampling subunit, configured to sample each key-pressing event generated by the mobile terminal; and a key-pressing event determination subunit, configured to determine, according to a sampling result of the key-pressing event sampling subunit, whether the key-pressing event is used for controlling to turn on the mobile terminal.

* * * * *